(12) United States Patent
Grant et al.

(10) Patent No.: US 10,692,200 B2
(45) Date of Patent: Jun. 23, 2020

(54) SENSOR LOCATION DETERMINATION FOR GEOGRAPHICAL REGION

(71) Applicant: Microsoft Technology Licensing, LLC, Redmond, WA (US)

(72) Inventors: Michael Grant, Seattle, WA (US); Ranveer Chandra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 15/962,764

(22) Filed: Apr. 25, 2018

(65) Prior Publication Data

US 2019/0333207 A1 Oct. 31, 2019

(51) Int. Cl.
*G06T 7/00* (2017.01)
*G06K 9/62* (2006.01)
*G06T 7/11* (2017.01)

(52) U.S. Cl.
CPC .......... *G06T 7/0002* (2013.01); *G06K 9/6215* (2013.01); *G06K 9/6223* (2013.01); *G06T 7/11* (2017.01); *G06T 2207/10004* (2013.01); *G06T 2207/10024* (2013.01);
(Continued)

(58) Field of Classification Search
CPC ......... G06T 7/0002; G06T 2207/10032; G06T 2207/10024; G06T 2207/10004; G06T 2207/20081; G06T 2207/30188; G06T 7/11; G06T 7/0012; G06K 9/6215; G06K 9/6223
See application file for complete search history.

(56) References Cited

U.S. PATENT DOCUMENTS 9,704,042 B2 7/2017 Wu et al.
2008/0198004 A1 8/2008 Luss
2016/0371865 A1 12/2016 Jedwab
(Continued)

FOREIGN PATENT DOCUMENTS

CN 103761722 A 4/2014
WO 2016144292 A1 9/2016
WO 2017011514 A1 1/2017

OTHER PUBLICATIONS

Ates et al. "Area-Priority-Based Sensor Deployment Optimisation with Priority Estimation Using K-means." IET Communications, vol. 11, iss.7, May 25, 2017, pp. 1082-1090 (Year: 2017).*
(Continued)

*Primary Examiner* — Jon Chang
(74) *Attorney, Agent, or Firm* — Schwegman Lundberg & Woessner, P.A.

(57) ABSTRACT

A method can include generating a feature vector based on image data and soil data, the image data of an image of the geographical region produced by an aerial vehicle, the image data representative of an attribute of the attributes of the soil or foliage, and the soil data indicating physical characteristics of soil of cells within the geographical region, producing a matrix including entries indicating how similar the cells are in terms of the image data and the soil data based on the feature vector, and producing based on the matrix, data indicating a cluster of clusters to which each cell of the cells belongs, each cell more similar to other cells of the cluster to which they belong than cells of other clusters, each cluster indicating a location at which to situate a sensor of the sensors to monitor the attribute.

20 Claims, 8 Drawing Sheets

(52) U.S. Cl.
CPC .............. *G06T 2207/10032* (2013.01); *G06T 2207/20081* (2013.01); *G06T 2207/30188* (2013.01)

(56) References Cited

U.S. PATENT DOCUMENTS

| | | | |
|---|---|---|---|
| 2018/0024271 A1* | 1/2018 | Koch | G01W 1/02 702/3 |
| 2018/0074499 A1* | 3/2018 | Cantrell | B64C 39/024 |
| 2019/0050948 A1* | 2/2019 | Perry | G06K 9/00657 |

OTHER PUBLICATIONS

Singh et al. "Novel Optimal Deployment of Sensor Nodes Using Bio Inspired Algorithm." IEEE International Conference on Advanced Communications, Control and Computing Technologies, May 8, 2014, pp. 847-851 (Year: 2014).*

Krause, et al., "Near-Optimal Sensor Placements in Gaussian Processes: Theory, Efficient Algorithms and Empirical Studies", In Journal of Machine Learning Research, vol. 9, Feb. 2008, pp. 235-284.

Omidali, et al., "Sensor Placement to Improve the Positioning Performance Based on Angle of Arrival (AOA)", In Journal of Wireless Engineering and Technology, vol. 1, Jul. 19, 2010, pp. 41-45.

Rukhmode, et al., "IOT Based Agriculture Monitoring System Using Wemos", In International Conference on Emanations in Modern Engineering Science and Management, vol. 5, Issue 3, Mar. 2017, pp. 14-19.

\* cited by examiner

SENSOR LOCATION DETERMINATION FOR GEOGRAPHICAL REGION

BACKGROUND

A geographical region, even a smaller geographical region, can be quite diverse in composition. For example, a geographical region can have variations in temperature and altitude, which can be correlated. Even in geographical regions with similar altitudes, the surrounding terrain can make one portion of the geographical region habitable and another nearby portion uninhabitable. In another example, moisture can run down one side of the hill, making a moisture profile of soil on both sides of the hill different. In a further example, a side of the hill that is facing north (in the northern hemisphere or south in the southern hemisphere) generally receives less sunlight and tends to remain moist longer and have lower temperature than a side of the hill facing another direction. This diversity in even small geographical regions makes it difficult to gain and retain knowledge of the different climate and land conditions in and around the geographical regions.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

A device for determining where to situate sensors in a geographical region to account for attribute variation of soil or foliage in the geographical region can include first processing circuitry configured to receive image data of an image of the geographical region, the image data representative of an attribute of the soil or foliage, receive soil data regarding physical characteristics of soil of cells within the geographical region, generate a feature vector based on the image data and the soil data, and produce a matrix including entries indicating how similar the cells are in terms of the image data and the soil data, second processing circuitry to implement a clustering circuitry configured to receive the matrix as input, and produce data indicating a cluster of clusters to which each cell of the cells belongs, each cell more similar, in terms of the soil data and image data, to other cells of the cluster to which they belong than cells of other clusters, each cluster indicating a location at which to situate a sensor of the sensors to monitor the attribute.

A method for determining where to situate sensors in a geographical region to account for attribute variation of one or more attributes of soil or foliage in the geographical region can include generating, by processing circuitry, a feature vector based on image data and soil data, the image data of an image of the geographical region produced by an aerial vehicle, the image data representative of an attribute of the attributes of the soil or foliage, and the soil data indicating physical characteristics of soil of cells within the geographical region, producing a matrix including entries indicating how similar the cells are in terms of the image data and the soil data based on the feature vector, and producing, at clustering circuitry and based on the matrix, data indicating a cluster of clusters to which each cell of the cells belongs, each cell more similar, in terms of the soil data and image data, to other cells of the cluster to which they belong than cells of other clusters, each cluster indicating a location at which to situate a sensor of the sensors to monitor the attribute.

A non-transitory machine-readable medium can include instructions that, when executed by a machine, configure the machine to perform operations comprising generating a feature vector based on image data and soil data, the image data of an image of the geographical region produced by an aerial vehicle, the image data representative of an attribute of the attributes of the soil or foliage, and the soil data indicating physical characteristics of soil of cells within the geographical region, producing a matrix including entries indicating how similar the cells are in terms of the image data and the soil data based on the feature vector, and producing data indicating a cluster of clusters to which each cell of the cells belongs, each cell more similar, in terms of the soil data and image data, to other cells of the cluster to which they belong than cells of other clusters, each cluster indicating a location at which to situate a sensor of the sensors to monitor the attribute.

DETAILED DESCRIPTION

Figure 1:
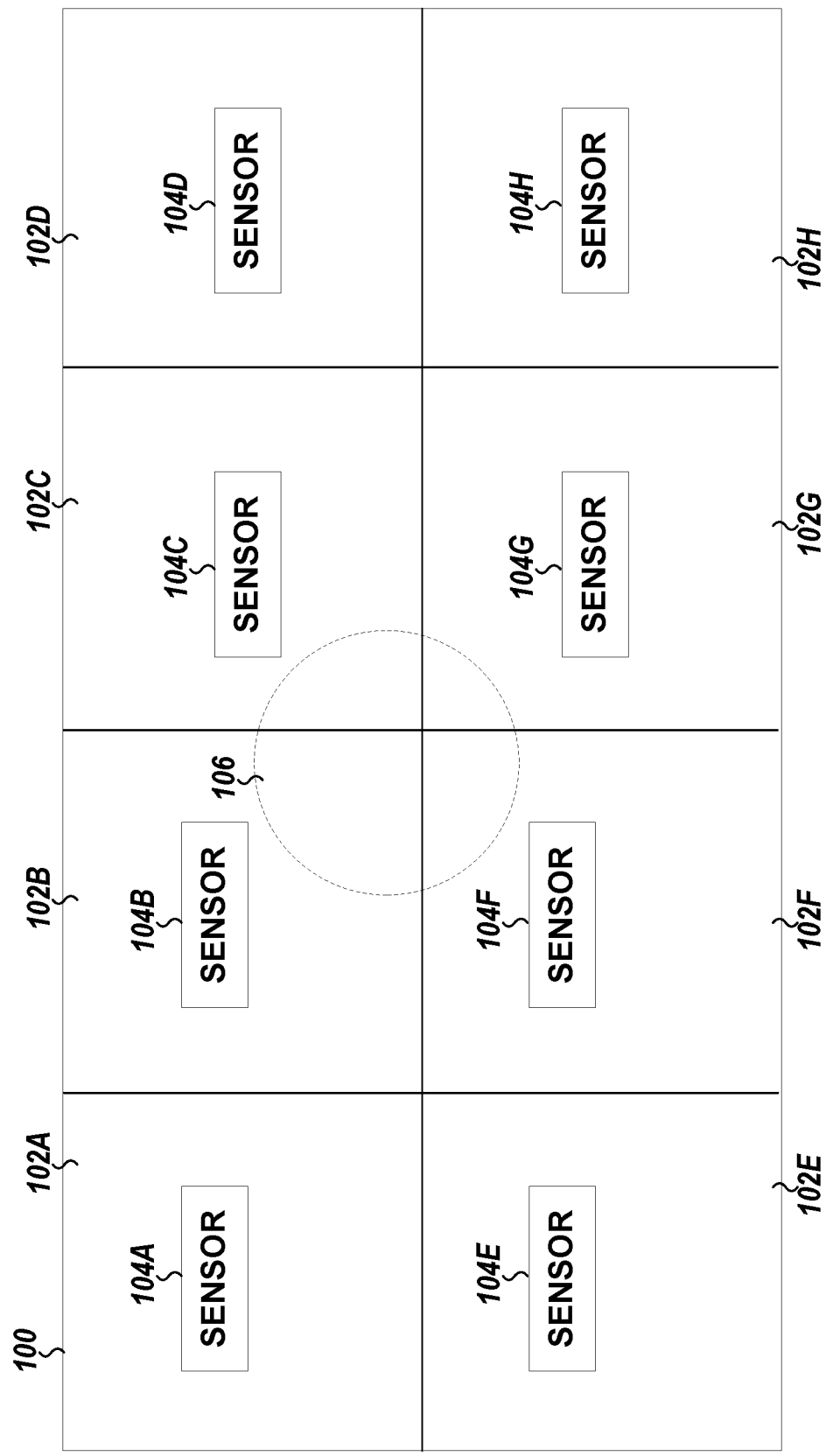
FIG. 1 illustrates, by way of example, a block diagram of an embodiment of sensors situated in respective cells of a geographical region.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

In optimizing operation of a farm, a geographical region on which a crop is grown or an animal is raised, knowledge of the land composition or climate can be helpful. To this end, many farms are logically split into a uniform grid of cells. Each cell is then equipped with one or more sensors to monitor the climate or land composition. This solution, however, is quite cost prohibitive and likely includes sensors that provide redundant information. The cost is high due to the large number of sensors needed, one sensor of each type in each cell of the grid, and the infrastructure to receive the information from the sensors. The redundant information can be from cells with similar land composition and climate attributes providing similar or the same sensor data readings.

An advantage of embodiments can include reducing a number of sensors or an amount of unnecessary (e.g., redundant) data from the sensors. To help reduce the number of sensors or an amount of unnecessary data, the geographical region can be split into a non-uniform grid of cells based on one or more attributes of the climate or land composition of the geographical region. The non-uniform grid can be used to determine where sensors can be situated, such as without foregoing any sensor data. For example, a first portion of a farm can have a different foliage profile than a second portion of the farm. Those portions can be equipped with different instances of the same sensor, such as to monitor the climate or land composition.

Consider further, a third portion of the farm that is non-contiguous with the first portion, but includes a similar foliage profile as the first portion. The data from the sensor in the first portion can be assumed to be valid for the third portion. In such a manner, the number of sensors used and data received from the sensors can be reduced.

In some embodiments, multiple types of sensors are to be deployed in the geographical region, such as to monitor respective attributes. The attribute monitored by a first sensor may have a different corresponding attribute map than another attribute monitored by a second sensor. In such an example, the attribute maps can be registered to each other or the geographical region and overlaid on each other. Sensors for both the attributes can be situated in regions corresponding to locations where the heterogeneous regions of the attribute maps overlap. In this manner, the number of electrical power devices required to power the sensors and an amount network communication infrastructure can be reduced relative to other solutions.

Reference will now be made to the FIGS. to describe further details of embodiments.

FIG. 1 illustrates, by way of example, a diagram of an embodiment of sensors 104A, 104B, 104C, 104D, 104E, 104F, 104G, and 104H situated in respective cells 102A, 102B, 102C, 102D, 102E, 102F, 102G, and 102H of a geographical region 100. The geographical region 100 is split into a uniform grid of cells 102A-102H. For each cell 102A-102H there are one or more sensors 104A-104H situated therein. Some drawbacks to situating sensors 104A-104H in each cell of a uniform grid include the cost and number of the sensors 104A-104H, the cost and amount of electrical components required to provide power to the sensors 104A-104H and manage data from the sensors 104A-104H, the amount of data being received from the sensors 104A-104H, and the amount of redundant data that is received from the sensors 104A-104H, and that there can be sub-regions within the grid of cells that have a unique climate or land composition attribute that is not being monitored.

Consider the sub-region corresponding to the dashed line 106 and assume that this region has an attribute that is unique in the geographical region 100. There are no sensors deployed in this region, thus no data is considered regarding unique a unique characteristic of this region (unique relative to a remainder of the geographical region 100. Thus, the uniform grid of cells 102A-102H can be insufficient to account for all the diversity in the geographical region 100.

Figure 2:
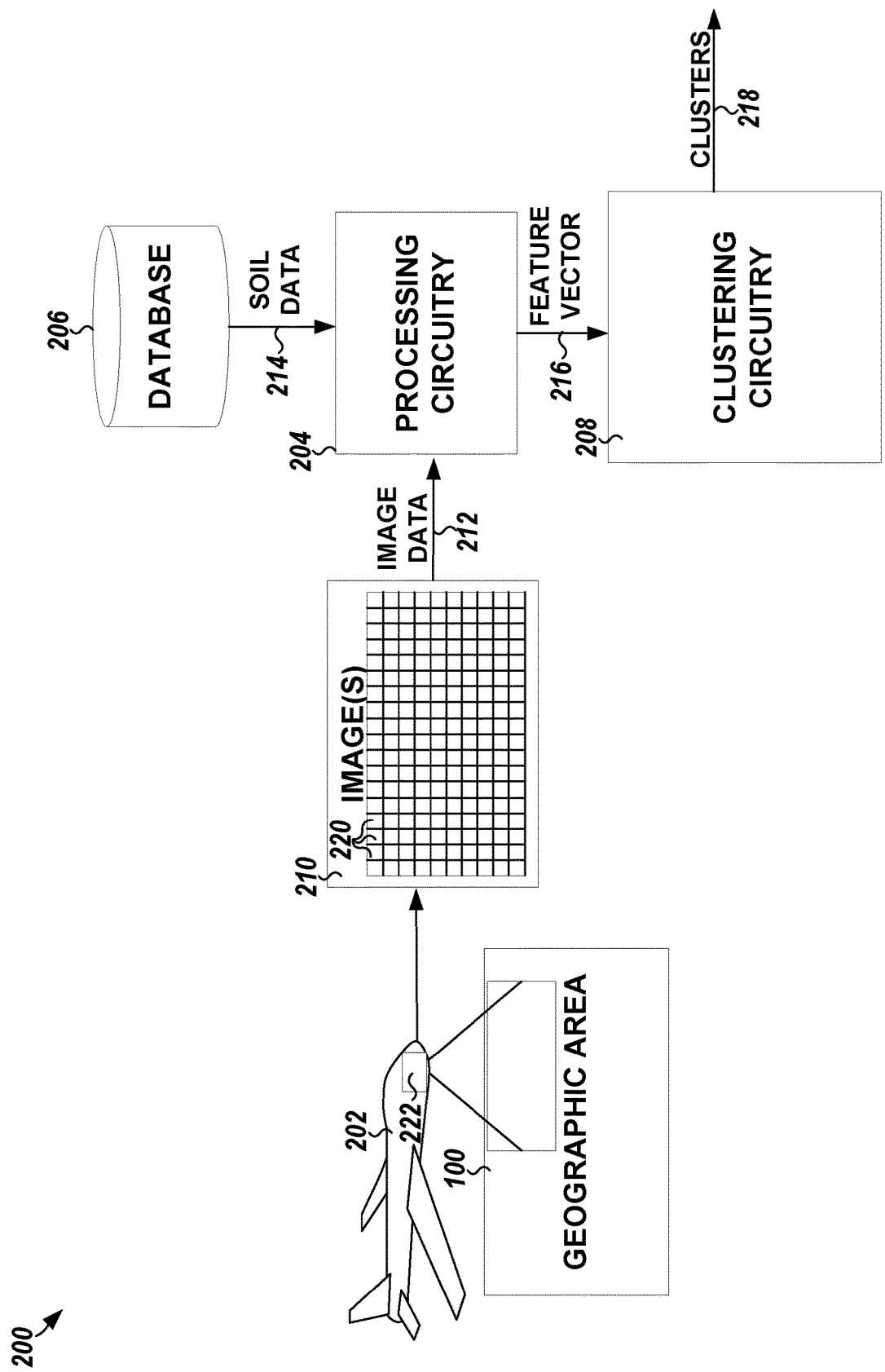
FIG. 2 illustrates, by way of example, a block flow diagram of an embodiment of a system for determining sensor deployment location for the geographic area of FIG. 1.

FIG. 2 illustrates, by way of example, a diagram of an embodiment of a system 200 for determining sensor deployment location for the geographic area 100. The system 200 can overcome one or more of the problems discussed regarding deploying sensors based on the uniform grid of cells of FIG. 1. The system 200 as illustrated includes an aerial vehicle 202, processing circuitry 204, a database 206, and a clustering circuitry 208.

The aerial vehicle 202 includes an imaging device 220 that captures one or more images of the geographic area 100. The aerial vehicle 202 can include an autonomous or manned aerial vehicle. The aerial vehicle 202 can include a drone, airplane, balloon, satellite, power glider, or the like. In some embodiments, the aerial vehicle 202 is not needed. Instead of using the aerial vehicle 202 to produce an image, an image can be produced by a user on the ground or another structure, such as a tower or building. The location on the ground, tower, or building can provide a vantage point at which the geographic area 100 can be within a field of view of the camera 222.

The aerial vehicle 202 can include an imaging device 220 that produces an image 210 of the geographic area 100. The image 210 can be a spectral image, such as can include data indicative of a visible color, black and white, infrared, ultraviolet, multi-spectral, or other image. The image 210 can be of the geographical region 100. Image data 212 representative of the image 210 can be provided to the processing circuitry 204.

The database 206 includes soil data 214 stored thereon. The soil data 214 can include physical soil characteristics. The physical soil characteristics can include soil texture (relative proportions of particles of various sizes, such as sand, silt, and clay in the soil), soil structure (arrangement of the particles of the soil), consistence (resistance of soil to deformation or rupture), particle density (mass per unit volume of soil particles—does not include pores), bulk density (mass of soil per unit volume of soil—includes pores), pore space (percent pore space can be determined based on the bulk density and particle density), Atterberg limits (moisture content at which a soil changes from plastic consistence to liquid consistence or vice versa), color, permeability (ability of soil to transmit water and air), or the like.

The database 206 can be local to (on a same network) or remote from (on a different network) the processing circuitry. For example, the soil data 214 can be manually determined by sampling the soil at the geographical location 100 or retrieved from a repository of soil data, such as can be available from the United States Department of Agriculture, or the like.

The processing circuitry 204 can include electrical or electronic components configured to perform operations of determining where to situate a sensor in the geographical region 100. The processing circuitry 204 can include a hardware processor, such as can include a central processing unit (CPU), a graphics processing unit (GPU), an application specific integrated circuit (ASIC), field programmable gate array (FPGA), circuitry, such as one or more transistors, resistors, capacitors, inductors, diodes, logic gates (e.g., AND, OR, XOR, or negate), multiplexers, oscillators, buffers, modulators, regulators, amplifiers, demodulators, or the like.

The processing circuitry 204 can receive the image data 212 and the soil data 214 and create a feature vector 216 based on the image data 212 and the soil data 214. A characteristic of the geographical region corresponding to the image data 212 can be inferred from the image data 212. For example, the characteristic can include soil moisture (e.g., as determined by a sensor), soil temperature (e.g., as determined by a sensor), soil organic carbon (percentage of soil organic matter in a top region of soil), leaf area index (LAI), plant "greenness" index, soil moisture, pH, land surface temperature (LST), or the like of the imaged geographical region.

Soil organic carbon has been shown to correlate with a Euclidean distance along a soil line. To determine soil organic carbon, sometimes called perpendicular vegetation index (PVI), Equations 1 and 2 can be used.

$$NIR_{790} = \beta_1 R_{660} + \beta_0 \text{(soil line)} \quad \text{Equation 1}$$

$$PVI = \frac{1}{\sqrt{\beta_1^2 + 1}} (NIR_{790} - \beta_1 R_{660} - \beta_0) \quad \text{Equation 2}$$

In Equations 1 and 2, $\beta_1$=slope of soil line, $\beta_0$=intercept of soil line, NIR is near infrared image data. LAI can be determined based on Equation 3.

$$MTVI2 = \frac{1.5[1.2*(NIR_{800} - G_{550}) - 2.5*(R_{670} - G_{550})]}{\sqrt{(2*NIR_{800} + 1)^2 - (6*NIR_{800} - 5\sqrt{R_{670}}} - 0.5} \quad \text{Equation 3}$$

In Equation 3 G is a green/yellow color intensity in an image and R is a red color intensity in the image. Plant greenness can be determined using Equation 4.

$$NDRE = \frac{NIR_{790} - RE_{735}}{NIR_{790} + RE_{735}} \quad \text{Equation 4}$$

In Equation 4, NDRE is a normalized difference red edge index.

Soil moisture, pH, and land surface temperature can be determined using an NDVI index. The NDVI index can be determined using Equation 5.

$$NDVI = \frac{NIR_{790} - R_{660}}{NIR_{790} + R_{660}}$$

With labeled data, many of the parameters of interest can be calculated with NDVI, but there are many indexes that can be used that target specific parameters, (e.g., Modified Triangular Vegetation Index—Improved (MTVI2) for LAI or (PVI) for organic carbon content etc.). The subscript in the equations above refer to the wavelength centers for that particular spectral band. The wavelength centers can vary slightly without affecting data quality. For example, whether NIR is centered at 800 nanometers or 790 nanometers, the data quality is generally not different.

The image data 212 and the soil data 214 can be partitioned by cell 222 in a uniform grid of cells. The size of each cell 222 can be smaller than the size of each cell 102A-102H. This smaller cell size can help guarantee that portions of the geographic area 100 with unique attributes include data in the image data 212 and the soil data 214. This helps the system 200 determine efficient sensor placement within the cells 222.

The processing circuitry 204 can determine, for each cell 222, an average and standard deviation for each attribute to consider. The attribute can include one or more spectral values from the image data 212 or one of the soil physical characteristics. Note that different image data can be used for different attributes and used to create respective attribute maps. The processing circuitry 204 can determine the feature vector 216 based on the average and standard deviation values. The feature vector 216 can include a covariance matrix or similarity matrix that includes at least one entry for each cell of the cells 220. The covariance matrix or similarity matrix can be produced using a radial basis function kernel. The values for each cell 222 can be in its own row in the feature vector 216. The average and standard deviation of the image data 212 can be in respective columns of the feature vector 216. The average and standard of the soil data 214 can be in other respective columns of the feature vector 216, and so on. If there are 64 grid cells 222, then there can be, for example, 64 rows in the feature vector 216.

Example feature vectors for a first attribute and a second attribute are provided below. The differences between the feature vectors are in the first column.

| Feature Vector for First Attribute | | | |
|---|---|---|---|
| $i1_1$ | $s1_1$ | $s2_1$ | ... |
| $i1_2$ | $s1_2$ | $s2_2$ | ... |
| $i1_3$ | $s1_3$ | $s2_3$ | ... |
| . | . | . | |
| . | . | . | |

| Feature Vector for Second Attribute | | | |
|---|---|---|---|
| $i2_1$ | $s1_1$ | $s2_1$ | ... |
| $i2_2$ | $s1_2$ | $s2_2$ | ... |
| $i2_3$ | $s1_3$ | $s2_3$ | ... |
| . | . | . | |
| . | . | . | |

In the feature vectors $im_j$ represents an average of the image data, i, in cell j of the image of attribute m, and $sp_j$ represents soil data, s, of soil of cell j corresponding to soil physical characteristic p.

The feature vector 216 can be provided as input to the radial basis function using the processing circuitry 204. A radial basis function is a real valued function whose value depends on a distance from another point (called a center). The distance can be a Euclidean distance or other distance. The radial basis function can be used as a kernel in vector classification, such as in embodiments herein. An example of a Gaussian radial basis function kernel is provided in Equation 1 where $x_i$ is a row of the feature vector 216 and $x_j$ is another row of the feature vector 216, and $\sigma \in [0, 1]$ is a tuning parameter. In some embodiments, a value of $\sigma$>0.90 provides better sensor placement results.

$$q(x_i, x_j) = \exp(\|x_i - x_j\|^2 / 2\sigma^2) \quad \text{Equation 1}$$

q is a square matrix with dimensions N×N, where N is the number of rows of the feature vector 216. Each entry in q is a number $\in [0, 1]$ that indicates an amount of similarity between two rows. The higher the number, the more similar the rows, and corresponding cell attributes. Each entry in the diagonal of k equals one (1). Other entries in q indicate similarity between attributes of the corresponding cells. For example, a fourth entry in the second row of q indicates the similarity between attributes of the second and fourth cells of the cells 222.

The clustering circuitry 208 can segregate entries of the q matrix into respective clusters 218. The number of clusters can be configurable, such as can be based on the number of sensors available for an attribute, a size of the geographical region 100, a number of power sources available to power the sensors, the network communication circuitry available to receive data from the sensors, a bandwidth of the network communication circuitry, an amount of storage space available to store the data from the sensors, or the like. The clustering circuitry 208 can perform a k-means clustering technique based on the q matrix to create the clusters 218.

A k-means clustering technique partitions n observations (in embodiments N cells) into k clusters. In k-means clustering, each observation is partitioned to the cluster with a nearest mean (sometimes called a cluster center). The k-means clustering technique can be implemented using the clustering circuitry 208, such as can implement an unsupervised machine-learning technique. A sensor can be placed at a location corresponding to each cluster. The data from the sensor corresponding to one of the clusters 218 can be assumed to be the same for other locations in the geographical region 100 corresponding to the same one of the clusters 218. In other words, each cluster consists of a contiguous area within the geographic area having similar values of the attribute or attributes.

Figure 3:
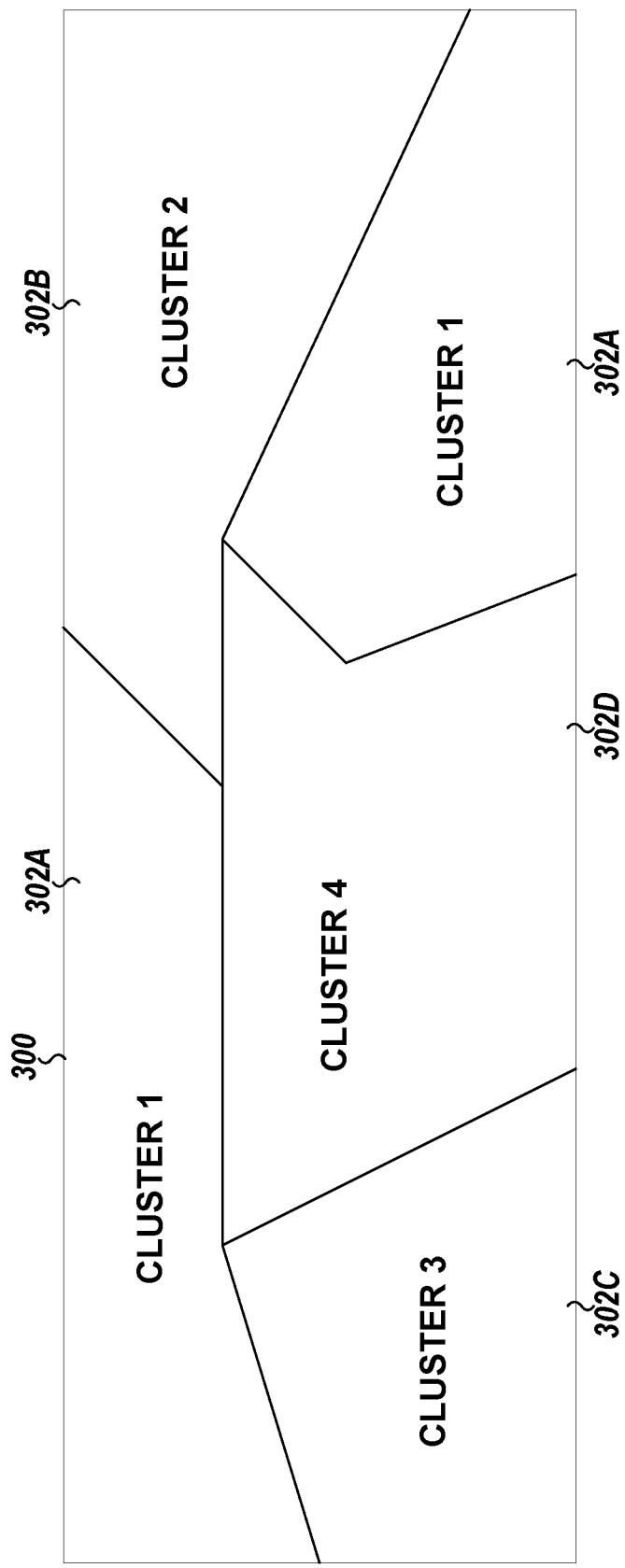
FIG. 3 illustrates, by way of example, a diagram of an embodiment of a geographical region split into regions based on a first attribute.

FIG. 3 illustrates, by way of example, a diagram of an embodiment of an attribute map 300 split into regions based on a first attribute. Instead of logically splitting the geographical region 100 into a uniform grid of cells as in FIG. 1, the attribute map 300 of FIG. 3 is split into heterogeneous areas 302A, 302B, 302C, and 302D based on attributes of the attribute map 300, such as by using the system 200.

The heterogeneous areas 302A-302D can each correspond to a different cluster of the clusters 218. Note that the heterogeneous area 302A-302D need not be contiguous in the attribute map 300. For example, the heterogeneous area 302A includes two regions in the attribute map 300 that do not share a border.

Figure 4:
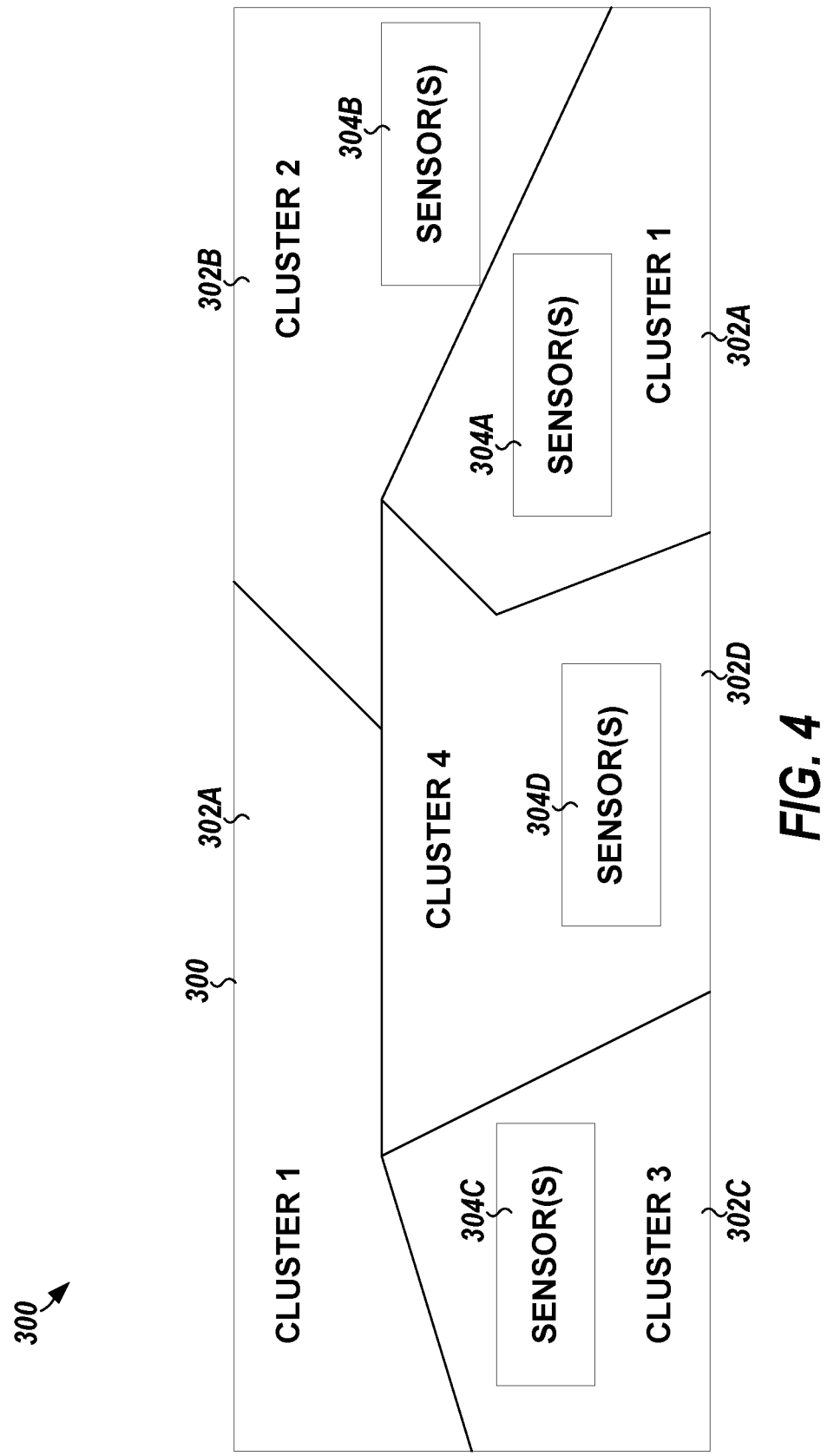
FIG. 4 illustrates, by way of example, a diagram of an embodiment of the geographical region of FIG. 3 with sensor(s) deployed therein.

FIG. 4 illustrates, by way of example, a diagram of an embodiment of the attribute map 300 with sensor(s) 304A, 304B, 304C, and 304D deployed therein. In the embodiment of FIG. 4, each heterogeneous area 302A-302D (e.g., each cluster) in the attribute map 300 is provided with sensor(s) 304A-304D. The sensors 304A-304D can include soil moisture, soil temperature, leaf wetness, solar radiation, wind, rain, humidity, air temperature, or dewpoint sensor, among others.

Note that the embodiment of FIG. 4 regards a simple case of placing sensor(s) 304A-304D to monitor a single attribute. In some embodiments, multiple attributes can be monitored. However, each attribute can have a different attribute map. The attribute map 300 represents an attribute map for a first attribute.

One solution to situating sensors based on multiple attributes can include placing a sensor at the center of each cluster of each attribute. That is, an attribute map can be created for each attribute to be monitored. For each cluster produced by the clustering circuitry 208, a sensor can be located within the geographical region corresponding to the cluster. However, such a solution is sub-optimal in terms of amount of communication network circuitry and power supply devices required to manage operation of the sensors.

A more efficient solution can include determining regions of overlap between clusters in a first attribute map and a second attribute map and locating multiple sensors near each other so that they may be powered by the same power circuitry or communicate over the same communication network circuitry.

Figure 5:
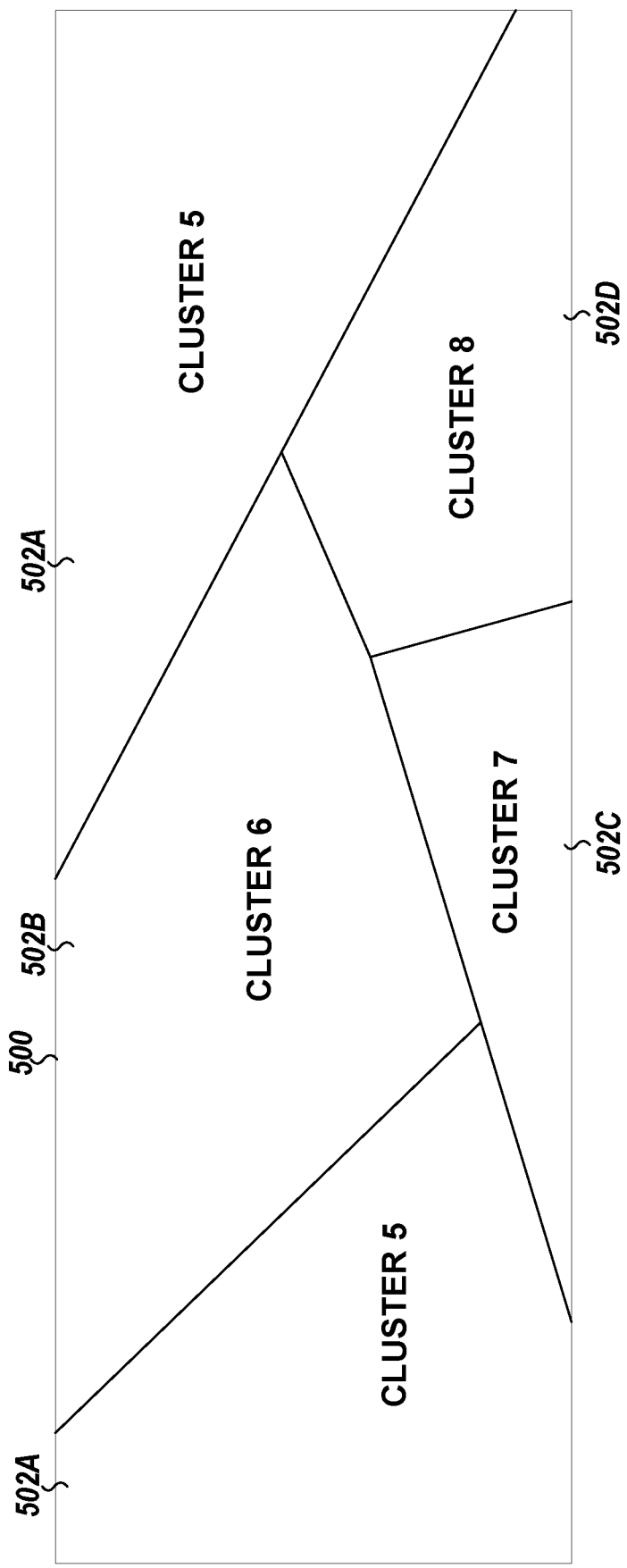
FIG. 5 illustrates, by way of example, a diagram of an embodiment of another attribute map.

FIG. 5 illustrates, by way of example, a diagram of an embodiment of another attribute map 500. The attribute map 500 can be created using the system 200, but using a different attribute than that used for generating the attribute map 300 of FIG. 3. The attribute map 500 as illustrated includes four heterogeneous areas 502A, 502B, 502C, and 502D corresponding to four different clusters of the attribute map 500. Using a different attribute to determine the heterogeneous areas 502A-502D results in a different segmentation as compared to using the attribute corresponding to the attribute map 300.

Figure 6:
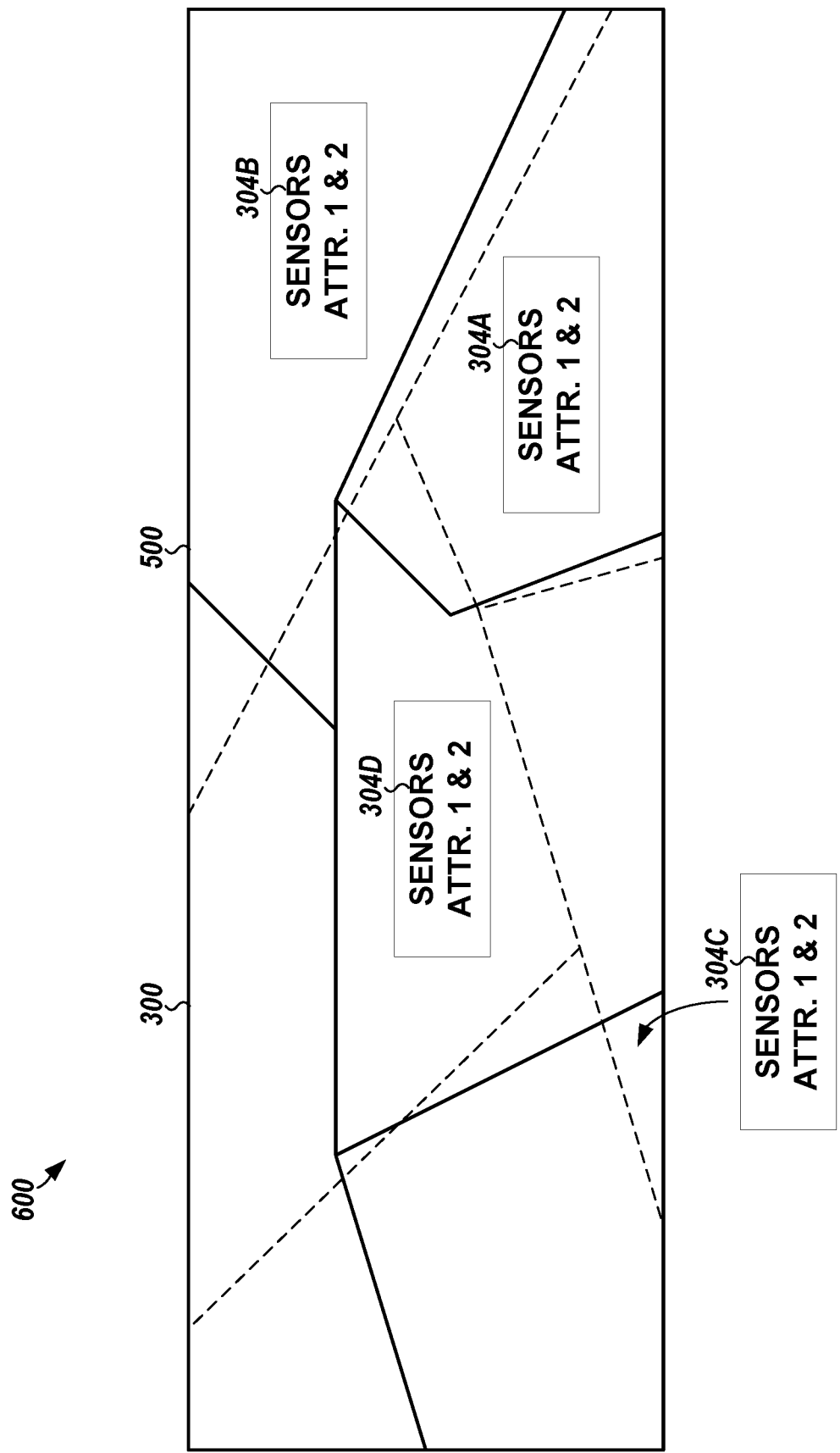
FIG. 6 illustrates, by way of example, a diagram of an embodiment of a combined attribute map that includes the attribute maps of FIGS. 3 and 5 overlaid on each other.

FIG. 6 illustrates, by way of example, a diagram of an embodiment of a combined attribute map 600 that includes the attribute maps 300 and 500 overlaid on each other. Note that in FIGS. 1, 4, and 6 the placement of the sensors illustrated is representative of an actual physical placement within the sub-region. The combined attribute map 600 includes sensors located in each geographical region corresponding to the heterogeneous areas 302A-302D and 502A-502D. Each heterogeneous area 302A-302D and 502A-502D corresponds to the clusters 218 produced for each of the two attribute maps 300 and 500. In this embodiment, only four sensor locations are required to gain information regarding all of the heterogeneous areas 302A-302D and 502A-502D.

The sensors 304A can monitor both attributes of the clusters 1 and 8, the sensors 304B can monitor both attributes of the clusters 2 and 5, the sensors 304D can monitor both attributes of the clusters 4 and 6, and the sensors 304C can monitor both attributes of the clusters 3 and 7. Each of the sensors 304A-304D can include a sensor to monitor the first attribute (e.g., sensor 304A-304D) and a sensor to monitor the second attribute. In this manner, the amount of communication network circuitry or power devices can be retained at or near that required to monitor just one attribute. Note that not all attributes overlap in a manner in which the same number of sensor locations can be used for multiple attributes as can be used for a single attribute. The embodiment illustrated just happens to work out that way.

Figure 7:
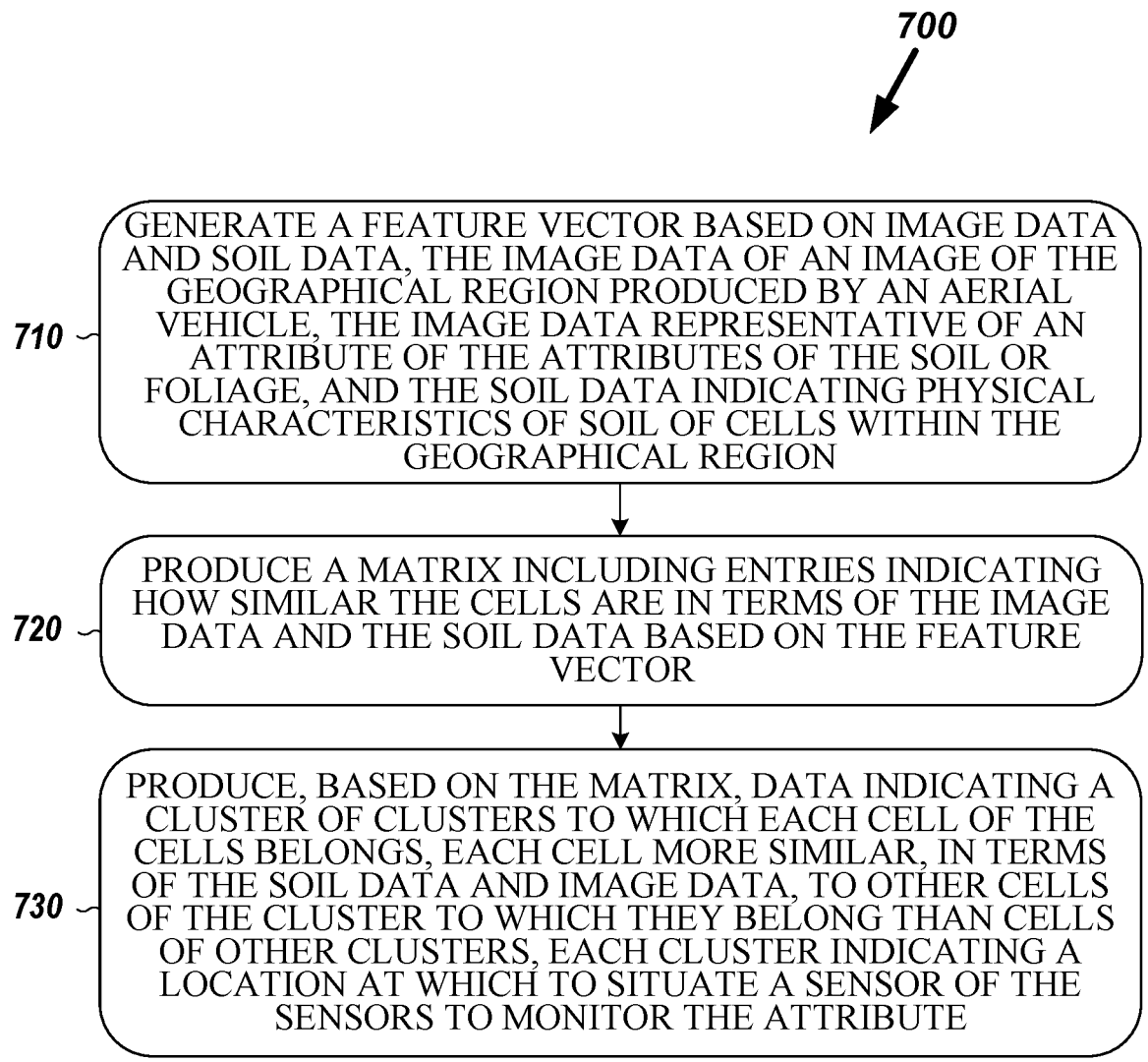
FIG. 7 illustrates, by way of example, a flow diagram of an embodiment of a method for sensor deployment in a geographical region.

FIG. 7 illustrates, by way of example, a diagram of an embodiment of a method 700 for sensor deployment in a geographical region. The method 700 as illustrated includes, generating (e.g., by processing circuitry) a feature vector based on image data and soil data, the image data of an image of the geographical region produced by an aerial vehicle, the image data representative of an attribute of the attributes of the soil or foliage, and the soil data indicating physical characteristics of soil of cells within the geographical region, at operation 710; producing a matrix including entries indicating how similar the cells are in terms of the image data and the soil data based on the feature vector, at operation 720; and producing, (e.g., by clustering circuitry) based on the matrix, data indicating a cluster of clusters to which each cell of the cells belongs, each cell more similar, in terms of the soil data and image data, to other cells of the cluster to which they belong than cells of other clusters, each cluster indicating a location at which to situate a sensor of the sensors to monitor the attribute, at operation 730.

The image data can include one or more of multi-spectral image data and color image data, the attribute includes one of soil moisture and soil temperature, and the physical characteristics of the soil include at least one of soil texture, soil structure, consistence, particle density, bulk density, pore space, color, and permeability. The feature vector can include, for each cell of the cells, an average of the image data corresponding to the cell and soil data corresponding to the cell for one or more of the physical characteristics. The method 700 can further include, wherein the image data is first image data of a first image and is representative of a first attribute, the feature vector is a first feature vector, the matrix is a first matrix, the data is first data, the cluster and clusters are a first cluster and first clusters, respectively, and the sensor and sensors are a first sensor and first sensors, respectively. The method 700 can further include receiving second image data of a second image of the geographical region, the second image data representative of a second attribute of the soil or foliage. The method 700 can further include generating a second feature vector based on the second image data and the soil data. The method 700 can further include producing a second matrix including entries indicating how similar the cells are in terms of the image data and the soil data. The method 700 can further include producing second data indicating a second cluster of second clusters to which each cell of the cells belongs, each cell more similar, in terms of the soil data and image data, to other cells of the second cluster to which they belong than cells of other second clusters, each second cluster indicating a location at which to situate a second sensor of second sensors to monitor the second attribute.

The method 700 can further include comparing the first clusters and the second clusters to determine locations in the geographical region where a cluster of the first cluster overlaps with a cluster of the second clusters. The method 700 can further include producing data indicating the locations of overlap in which to place both (a) a sensor of the first sensors and (b) a second sensor of the second sensors.

The method 700 can further include, wherein the feature vector includes, for each cell of the cells, an average of the image data corresponding to the cell and soil data corresponding to the cell for one or more of the physical characteristics. The method 700 can further include, wherein the feature vector includes a row of data for each cell of the cells, each row including data for that cell. The method 700 can further include, wherein generating the matrix includes using a radial basis function with the feature vector as input. The method 700 can further include, wherein the radial basis function is a Gaussian radial basis function. The method 700 can further include, wherein producing the data indicating a cluster of clusters to which each cell of the cells belongs includes using a k-means clustering unsupervised machine learning technique.

Figure 8:
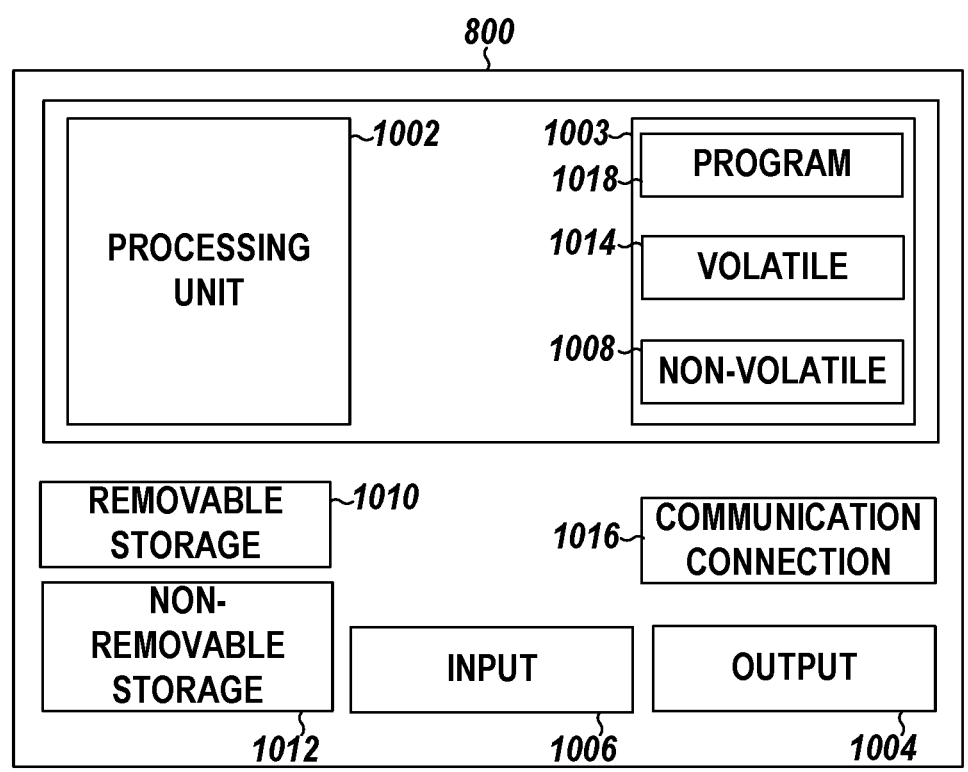
FIG. 8 illustrates, by way of example, a block diagram of an embodiment of a machine (e.g., a computer system) to implement one or more embodiments.

FIG. 8 illustrates, by way of example, a block diagram of an embodiment of a machine 800 (e.g., a computer system) to implement one or more embodiments. One example machine 800 (in the form of a computer), may include a processing unit 1002, memory 1003, removable storage 1010, and non-removable storage 1012. Although the example computing device is illustrated and described as machine 800, the computing device may be in different forms in different embodiments. For example, the computing device may instead be a smartphone, a tablet, smartwatch, or other computing device including the same or similar elements as illustrated and described regarding FIG. 8. Devices such as smartphones, tablets, and smartwatches are generally collectively referred to as mobile devices. Further, although the various data storage elements are illustrated as part of the machine 800, the storage may also or alternatively include cloud-based storage accessible via a network, such as the Internet.

Memory 1003 may include volatile memory 1014 and non-volatile memory 1008. The machine 800 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 800 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the machine 800, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1002 of the machine 800. A hard drive, CD-ROM, and RAM are some examples of articles including a non-transitory computer-readable medium such as a storage device. For example, a computer program 1018 may be used to cause processing unit 1002 to perform one or more methods or algorithms described herein.

Additional notes and examples:

Example 1 includes a device for determining where to situate sensors in a geographical region to account for attribute variation of soil or foliage in the geographical region, the device comprising first processing circuitry configured to receive image data of an image of the geographical region, the image data representative of an attribute of the soil or foliage, receive soil data regarding physical characteristics of soil of cells within the geographical region, generate a feature vector based on the image data and the soil data, and produce a matrix including entries indicating how similar the cells are in terms of the image data and the soil data, second processing circuitry to implement a clustering circuitry configured to receive the matrix as input, and produce data indicating a cluster of clusters to which each cell of the cells belongs, each cell more similar, in terms of the soil data and image data, to other cells of the cluster to which they belong than cells of other clusters, each cluster indicating a location at which to situate a sensor of the sensors to monitor the attribute.

In Example 2, Example 1 further includes, wherein the image data includes one of multi-spectral image data and color image data, and the attribute includes one of soil moisture and soil temperature.

In Example 3, at least one of Examples 1-2 can further include, wherein the physical characteristics of the soil include at least one of soil texture, soil structure, consistence, particle density, bulk density, pore space, color, and permeability.

In Example 4, at least one of Examples 1-3 can further include, wherein the feature vector includes, for each cell of the cells, an average of the image data corresponding to the cell and soil data corresponding to the cell for one or more of the physical characteristics.

In Example 5, Example 4 can further include, wherein the feature vector includes a row of data for each cell of the cells, each row including data for that cell.

In Example 6, at least one of Examples 1-5 can further include, wherein generating the matrix includes using a radial basis function with the feature vector as input.

In Example 7, Example 6 can further include, wherein the radial basis function is a Gaussian radial basis function.

In Example 8, at least one of Examples 1-7 can further include, wherein producing the data indicating a cluster of clusters to which each cell of the cells belongs includes using a k-means clustering unsupervised machine learning technique.

In Example 9, at least one of Examples 1-8 can further include, wherein the image data is first image data of a first image and is representative of a first attribute, the feature vector is a first feature vector, the matrix is a first matrix, the data is first data, the cluster and clusters are a first cluster and first clusters, respectively, and the sensor and sensors are a first sensor and first sensors, respectively, and wherein the first processing circuitry is further configured to receive second image data of a second image of the geographical region, the second image data representative of a second attribute of the soil or foliage, generate a second feature vector based on the second image data and the soil data, and produce a second matrix including entries indicating how similar the cells are in terms of the image data and the soil data, the second processing circuitry is further configured to receive the second matrix as input, and produce second data indicating a second cluster of second clusters to which each cell of the cells belongs, each cell more similar, in terms of the soil data and image data, to other cells of the second cluster to which they belong than cells of other second clusters, each second cluster indicating a location at which to situate a second sensor of second sensors to monitor the second attribute.

In Example 10, Example 9 can further include, wherein the first processing circuitry is further configured to compare the first clusters and the second clusters to determine locations in the geographical region where a cluster of the first cluster overlaps with a cluster of the second clusters, and produce data indicating the locations of overlap in which to place both (a) a sensor of the first sensors and (b) a second sensor of the second sensors.

Example 11 includes a method for determining where to situate sensors in a geographical region to account for attribute variation of one or more attributes of soil or foliage in the geographical region, the device comprising generating, by processing circuitry, a feature vector based on image data and soil data, the image data of an image of the geographical region produced by an aerial vehicle, the image data representative of an attribute of the attributes of the soil or foliage, and the soil data indicating physical characteristics of soil of cells within the geographical region, producing a matrix including entries indicating how similar the cells are in terms of the image data and the soil data based on the feature vector, and producing, at a clustering circuitry and based on the matrix, data indicating a cluster of clusters to which each cell of the cells belongs, each cell more similar, in terms of the soil data and image data, to other cells of the cluster to which they belong than cells of other clusters, each cluster indicating a location at which to situate a sensor of the sensors to monitor the attribute.

In Example 12, Example 11 can further include, wherein the image data includes one of multi-spectral image data and color image data, the attribute includes one of soil moisture and soil temperature, and the physical characteristics of the soil include at least one of soil texture, soil structure, consistence, particle density, bulk density, pore space, color, and permeability.

In Example 13, at least one of Examples 11-12 can further include, wherein the feature vector includes, for each cell of the cells, an average of the image data corresponding to the cell and soil data corresponding to the cell for one or more of the physical characteristics.

In Example 14, at least one of Examples 11-13 can further include, wherein the image data is first image data of a first image and is representative of a first attribute, the feature vector is a first feature vector, the matrix is a first matrix, the data is first data, the cluster and clusters are a first cluster and first clusters, respectively, and the sensor and sensors are a first sensor and first sensors, respectively, and wherein the method further comprises receiving second image data of a second image of the geographical region, the second image data representative of a second attribute of the soil or foliage, generating a second feature vector based on the second image data and the soil data, producing a second matrix including entries indicating how similar the cells are in terms of the image data and the soil data, and producing second data indicating a second cluster of second clusters to which each cell of the cells belongs, each cell more similar, in terms of the soil data and image data, to other cells of the second cluster to which they belong than cells of other second clusters, each second cluster indicating a location at which to situate a second sensor of second sensors to monitor the second attribute.

In Example 15, Example 14 can further include comparing the first clusters and the second clusters to determine locations in the geographical region where a cluster of the first cluster overlaps with a cluster of the second clusters, and producing data indicating the locations of overlap in which to place both (a) a sensor of the first sensors and (b) a second sensor of the second sensors.

Example 16 includes a non-transitory machine-readable medium including instructions that, when executed by a machine, configure the machine to perform operations comprising generating a feature vector based on image data and soil data, the image data of an image of the geographical region produced by an aerial vehicle, the image data representative of an attribute of the attributes of the soil or foliage, and the soil data indicating physical characteristics of soil of cells within the geographical region, producing a matrix including entries indicating how similar the cells are in terms of the image data and the soil data based on the feature vector, and producing data indicating a cluster of clusters to which each cell of the cells belongs, each cell more similar, in terms of the soil data and image data, to other cells of the cluster to which they belong than cells of other clusters, each cluster indicating a location at which to situate a sensor of the sensors to monitor the attribute.

In Example 17, Example 16 can further include, wherein the feature vector includes a row of data for each cell of the cells, each row including data for that cell, and wherein producing the data indicating a cluster of clusters to which each cell of the cells belongs includes using a k-means clustering unsupervised machine learning technique.

In Example 18, at least one of Examples 16-17 can further include, wherein generating the matrix includes using a radial basis function to generate the matrix with the feature vector as input, and wherein the radial basis function is a Gaussian radial basis function.

In Example 19, at least one of Examples 16-18 can further include, wherein the image data is first image data of a first image and is representative of a first attribute, the feature vector is a first feature vector, the matrix is a first matrix, the data is first data, the cluster and clusters are a first cluster and first clusters, respectively, and the sensor and sensors are a first sensor and first sensors, respectively, and wherein the operations further comprise receiving second image data of a second image of the geographical region, the second image data representative of a second attribute of the soil or foliage, generating a second feature vector based on the second image data and the soil data, producing a second matrix including entries indicating how similar the cells are in terms of the image data and the soil data, and producing second data indicating a second cluster of second clusters to which each cell of the cells belongs, each cell more similar, in terms of the soil data and image data, to other cells of the second cluster to which they belong than cells of other second clusters, each second cluster indicating a location at which to situate a second sensor of second sensors to monitor the second attribute.

In Example 20, Example 19 can further include, wherein the operations further comprise comparing the first clusters and the second clusters to determine locations in the geographical region where a cluster of the first cluster overlaps with a cluster of the second clusters, and producing data indicating the locations of overlap in which to place both (a) a sensor of the first sensors and (b) a second sensor of the second sensors.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A device for determining where to situate sensors in a geographical region to account for attribute variation of soil or foliage in the geographical region, the device comprising:
   first processing circuitry configured to:
   receive image data of an image of the geographical region, the image data representative of an attribute of the soil or foliage;
   receive soil data regarding physical characteristics of soil of cells within the geographical region;
   generate a feature vector based on the image data and the soil data; and
   produce a matrix including entries indicating how similar the cells are in terms of the image data and the soil data;
   second processing circuitry to implement a clustering circuitry configured to:
   receive the matrix as input; and
   produce data indicating a cluster of clusters to which each cell of the cells belongs, each cell more similar, in terms of the soil data and image data, to other cells of the cluster to which they belong than cells of other clusters, each cluster indicating a location at which to situate a sensor of the sensors to monitor the attribute.

2. The device of claim 1, wherein the image data includes one of multi-spectral image data and color image data, and the attribute includes one of soil moisture and soil temperature.

3. The device of claim 1, wherein the physical characteristics of the soil include at least one of soil texture, soil structure, consistence, particle density, bulk density, pore space, color, and permeability.

4. The device of claim 1, wherein the feature vector includes, for each cell of the cells, an average of the image data corresponding to the cell and soil data corresponding to the cell for one or more of the physical characteristics.

5. The device of claim 4, wherein the feature vector includes a row of data for each cell of the cells, each row including data for that cell.

6. The device of claim 1, wherein producing the matrix includes using a radial basis function with the feature vector as input.

7. The device of claim 6, wherein the radial basis function is a Gaussian radial basis function.

8. The device of claim 1, wherein producing the data indicating a cluster of clusters to which each cell of the cells belongs includes using a k-means clustering unsupervised machine learning technique.

9. The device of claim 1, wherein the image data is first image data of a first image and is representative of a first attribute, the feature vector is a first feature vector, the matrix is a first matrix, the data is first data, the cluster and clusters are a first cluster and first clusters, respectively, and the sensor and sensors are a first sensor and first sensors, respectively, and wherein the first processing circuitry is further configured to:
   receive second image data of a second image of the geographical region, the second image data representative of a second attribute of the soil or foliage;
   generate a second feature vector based on the second image data and the soil data; and
   produce a second matrix including entries indicating how similar the cells are in terms of the image data and the soil data;
   the second processing circuitry is further configured to:
   receive the second matrix as input; and
   produce second data indicating a second cluster of second clusters to which each cell of the cells belongs, each cell more similar, in terms of the soil data and image data, to other cells of the second cluster to which they belong than cells of other second clusters, each second cluster indicating a location at which to situate a second sensor of second sensors to monitor the second attribute.

10. The device of claim 9, wherein the first processing circuitry is further configured to:
    compare the first clusters and the second clusters to determine locations in the geographical region where a cluster of the first cluster overlaps with a cluster of the second clusters; and
    produce data indicating the locations of overlap in which to place both (a) a sensor of the first sensors and (b) a second sensor of the second sensors.

11. A method for determining where to situate sensors in a geographical region to account for attribute variation of one or more attributes of soil or foliage in the geographical region, the method comprising:
    generating, by processing circuitry, a feature vector based on image data and soil data, the image data of an image of the geographical region produced by an aerial vehicle, the image data representative of an attribute of the attributes of the soil or foliage, and the soil data indicating physical characteristics of soil of cells within the geographical region;

producing a matrix including entries indicating how similar the cells are in terms of the image data and the soil data based on the feature vector; and producing, at clustering circuitry and based on the matrix, data indicating a cluster of clusters to which each cell of the cells belongs, each cell more similar, in terms of the soil data and image data, to other cells of the cluster to which they belong than cells of other clusters, each cluster indicating a location at which to situate a sensor of the sensors to monitor the attribute.

12. The method of claim 11, wherein the image data includes one of multi-spectral image data and color image data, the attribute includes one of soil moisture and soil temperature, and the physical characteristics of the soil include at least one of soil texture, soil structure, consistence, particle density, bulk density, pore space, color, and permeability.

13. The method of claim 11, wherein the feature vector includes, for each cell of the cells, an average of the image data corresponding to the cell and soil data corresponding to the cell for one or more of the physical characteristics.

14. The method of claim 11, wherein the image data is first image data of a first image and is representative of a first attribute, the feature vector is a first feature vector, the matrix is a first matrix, the data is first data, the cluster and clusters are a first cluster and first clusters, respectively, and the sensor and sensors are a first sensor and first sensors, respectively, and wherein the method further comprises:

receiving second image data of a second image of the geographical region, the second image data representative of a second attribute of the soil or foliage;

generating a second feature vector based on the second image data and the soil data;

producing a second matrix including entries indicating how similar the cells are in terms of the image data and the soil data; and producing second data indicating a second cluster of second clusters to which each cell of the cells belongs, each cell more similar, in terms of the soil data and image data, to other cells of the second cluster to which they belong than cells of other second clusters, each second cluster indicating a location at which to situate a second sensor of second sensors to monitor the second attribute.

15. The method of claim 14, further comprising:

comparing the first clusters and the second clusters to determine locations in the geographical region where a cluster of the first cluster overlaps with a cluster of the second clusters; and producing data indicating the locations of overlap in which to place both (a) a sensor of the first sensors and (b) a second sensor of the second sensors.

16. A non-transitory machine-readable medium including instructions that, when executed by a machine, configure the machine to perform operations comprising:

generating a feature vector based on image data and soil data, the image data of an image of the geographical region produced by an aerial vehicle, the image data representative of an attribute of attributes of the soil or foliage, and the soil data indicating physical characteristics of soil of cells within the geographical region;

producing a matrix including entries indicating how similar the cells are in terms of the image data and the soil data based on the feature vector; and producing data indicating a cluster of clusters to which each cell of the cells belongs, each cell more similar, in terms of the soil data and image data, to other cells of the cluster to which they belong than cells of other clusters, each cluster indicating a location at which to situate a sensor of sensors to monitor the attribute.

17. The non-transitory machine-readable medium of claim 16, wherein the feature vector includes a row of data for each cell of the cells, each row including data for that cell, and wherein producing the data indicating a cluster of clusters to which each cell of the cells belongs includes using a k-means clustering unsupervised machine learning technique.

18. The non-transitory machine-readable medium of claim 16, wherein producing the matrix includes using a radial basis function to generate the matrix with the feature vector as input, and wherein the radial basis function is a Gaussian radial basis function.

19. The non-transitory machine-readable medium of claim 16, wherein the image data is first image data of a first image and is representative of a first attribute, the feature vector is a first feature vector, the matrix is a first matrix, the data is first data, the cluster and clusters are a first cluster and first clusters, respectively, and the sensor and sensors are a first sensor and first sensors, respectively, and wherein the operations further comprise:

receiving second image data of a second image of the geographical region, the second image data representative of a second attribute of the soil or foliage;

generating a second feature vector based on the second image data and the soil data;

producing a second matrix including entries indicating how similar the cells are in terms of the image data and the soil data; and producing second data indicating a second cluster of second clusters to which each cell of the cells belongs, each cell more similar, in terms of the soil data and image data, to other cells of the second cluster to which they belong than cells of other second clusters, each second cluster indicating a location at which to situate a second sensor of second sensors to monitor the second attribute.

20. The non-transitory machine-readable medium of claim 19, wherein the operations further comprise:

comparing the first clusters and the second clusters to determine locations in the geographical region where a cluster of the first cluster overlaps with a cluster of the second clusters; and producing data indicating the locations of overlap in which to place both (a) a sensor of the first sensors and (b) a second sensor of the second sensors.

* * * * *